United States Patent
Ma et al.

(10) Patent No.: US 12,467,041 B2
(45) Date of Patent: Nov. 11, 2025

(54) PFU DNA POLYMERASE MUTANTS WITH REVERSE TRANSCRIPTASE ACTIVITY AND THEIR APPLICATIONS

(71) Applicant: HUBEI UNIVERSITY, Hubei (CN)

(72) Inventors: Lixin Ma, Hubei (CN); Wanping Chen, Hubei (CN); Rui Han, Hubei (CN); Fei Wang, Hubei (CN); Nianzu He, Hubei (CN); Jiakai Cui, Hubei (CN)

(73) Assignee: HUBEI UNIVERSITY, Wuhan (CN)

(*) Notice: Subject to any disclaimer, the term of this patent is extended or adjusted under 35 U.S.C. 154(b) by 0 days.

(21) Appl. No.: 19/014,260

(22) Filed: Jan. 9, 2025

(65) Prior Publication Data

US 2025/0188430 A1 Jun. 12, 2025

Related U.S. Application Data

(63) Continuation of application No. PCT/CN2024/111090, filed on Aug. 9, 2024.

(30) Foreign Application Priority Data

Dec. 12, 2023 (CN) .......... 202311718419.6

(51) Int. Cl.
*C12N 9/12* (2006.01)
*C12Q 1/686* (2018.01)

(52) U.S. Cl.
CPC .......... *C12N 9/1252* (2013.01); *C12Q 1/686* (2013.01); *C12Y 207/07007* (2013.01)

(58) Field of Classification Search
None
See application file for complete search history.

(56) References Cited

U.S. PATENT DOCUMENTS

| 9,181,534 | B1 | 11/2015 | Hogrefe et al. |
| 2003/0228616 | A1 | 12/2003 | Arezi et al. |
| 2017/0327818 | A1 | 11/2017 | Ellington et al. |

FOREIGN PATENT DOCUMENTS

| CN | 115896063 A | 4/2023 |
| CN | 117126826 A | 11/2023 |
| CN | 117778348 A | 3/2024 |

OTHER PUBLICATIONS

Singh et al. (Curr. Protein Pept. Sci. 18:1-11, 2017).*
Zhang et al. (Structure 26:1474-1485, 2018).*
International Search Report issued in corresponding International application No. PCT/CN2024/111090, mailed Nov. 14, 2024, 12 pages.
Written Opinion of the International Search Authority in corresponding International application No. PCT/CN2024/111090, mailed Nov. 14, 2024, 9 pages.
Nianzu He; "Rational design of Pfu DNA polymerase reverse transcription activity mutant and its activity exploration", A Thesis Submitted for the Degree of Master, Basic Science and Technology, Text sections 3.2-3.4 and Figure 3-4, date of issue Mar. 15, 2024, 68 pages.
Woo Suk Choia et al., "How a B family DNA polymerase has been evolved to copy RNA", PNAS, pp. 21274-21280, date of issue Aug. 17, 2020, 7 pages.

* cited by examiner

*Primary Examiner* — Richard G Hutson
(74) *Attorney, Agent, or Firm* — Hemisphere Law, PLLC; Zhigang Ma (57) ABSTRACT

Pfu DNA polymerase mutants with reverse transcriptase activity and their applications are provided. The Pfu DNA polymerase mutants include K467R/F588L/W769R, R382H/Y385H/V390I, I38L/R97M, E665K/E735K, K118I/N713V, with K118I/N713V showing the strongest reverse transcription activity. These Pfu DNA polymerase mutants still retain the polymerase activity of wild-type enzymes, thus providing higher assurance compared to traditional reverse transcriptase. Meanwhile, these Pfu DNA polymerase mutants exhibit high heat tolerance. Therefore, these Pfu DNA polymerase mutants can efficiently and high fidelity generate cDNA using RNA as a substrate, and further amplify the cDNA under conventional PCR reaction conditions without the need for additional reverse transcriptase, achieving a "one-step" RT-PCR process.

2 Claims, 3 Drawing Sheets

Specification includes a Sequence Listing.

PFU DNA POLYMERASE MUTANTS WITH REVERSE TRANSCRIPTASE ACTIVITY AND THEIR APPLICATIONS

FIELD OF THE DISCLOSURE

The present disclosure relates to Pfu DNA polymerase mutants with reverse transcriptase activity and their applications.

STATEMENT REGARDING SEQUENCE LISTING

The sequence listing associated with this application was previously provided in text format in lieu of a paper copy and is hereby incorporated by reference into the specification. The name of the XML file containing the sequence listing is Sequence-Listing.xml. The XML file is 7,548 bytes; is created on Dec. 26, 2024; and is being submitted electronically via patent center. A replacement of the sequence listing is submitted as an XML file, submitted via EFS-Web, with a file name of "Sequence-Listing-v2.XML", a creation date of Feb. 25, 2025 and a size of 7,630 bytes. The replacement of the sequence listing filed via EFS-Web is a part of the specification and is incorporated in its entirety by reference herein.

BACKGROUND

With the outbreak of the COVID-19 epidemic, it is particularly important to detect RNA virus quickly and accurately. Reverse transcription-quantitative real-time PCR (RT-qPCR) is currently the gold standard for detecting RNA viruses.

At present, RT-qPCR requires the combined use of reverse transcriptase and Taq DNA polymerase. Due to the intolerance of reverse transcriptase to high temperatures, it is necessary to perform reverse transcription at a lower temperature first, and then increase the temperature for PCR. In addition, if the RNA to be tested has advanced structure, sample pretreatment is required, which is cumbersome and time-consuming. Furthermore, the activity of both enzymes will be affected after mixing, resulting in prolonged reverse transcription time. Moreover, Taq DNA polymerase will compete with reverse transcriptase to bind the template, resulting in significantly reduced detection sensitivity under less template conditions. Therefore, developing a DNA polymerase with high reverse transcriptase activity is of great significance for the field of RNA detection.

Pfu DNA polymerase was first isolated and purified from *Pyrococcus furiosus* in 1991. It exhibits 3'→5' exonuclease activity and has higher activity than Taq DNA polymerase. The molecular weight of Pfu DNA polymerase is approximately 90 kDa, and it has the activity to catalyze the polymerization of deoxyribonucleotides (DNA) in the 5'→3' direction, as well as the activity of 3'→5' exonuclease (correction), but does not have reverse transcriptase activity. Pfu DNA polymerase has 5 different domains, including N-terminal domain (1-130, 327-368), 3'→5' exonuclease domain (131-326), palm domain (369-450, 501-588), finger domain (451-500), and thumb domain (589-775).

SUMMARY

By rational design of Pfu DNA polymerase, the present disclosure provides several Pfu DNA polymerase mutants with both high reverse transcriptase activity and polymerase activity, thereby achieving one-step RT-PCR using a single enzyme.

The purpose of the disclosure is realized through the following technical solutions:

In the first aspect, the present disclosure provides a Pfu DNA polymerase mutant with reverse transcriptase activity, which is any of the following:

K467R/F588L/W769R mutant, compared with the wild-type Pfu DNA polymerase shown in SEQ ID NO.1, has a mutation from lysine (Lys, K) to arginine (Arg, R) at position 467, phenylalanine (Phe, F) to leucine (Leu, L) at position 588, and tryptophan (Trp, W) to Arg at position 769 in its amino acid sequence;

R382H/Y385H/V390I mutant, compared with the wild-type Pfu DNA polymerase shown in SEQ ID NO.1, has a mutation from Arg to histidine (His, H) at positions 382 and 385, and valine (Val, V) to isoleucine (Ile, I) at position 390 in its amino acid sequence;

I38L/R97M mutant, compared with the wild-type Pfu DNA polymerase shown in SEQ ID NO.1, has a mutation from Ile to Leu at positions 38, and Arg to methionine (Met, M) at positions 97 in its amino acid sequence;

E665K/E735K mutant, compared with the wild-type Pfu DNA polymerase shown in SEQ ID NO.1, has a mutation from glutamic acid (Glu, E) to Lys at positions 665 and 735 in its amino acid sequence;

K118I/N713V mutant, compared with the wild-type Pfu DNA polymerase shown in SEQ ID NO.1, has a mutation from Lys to Ile at positions118, and asparagine (Asn, N) to Val at positions 713 in its amino acid sequence.

The present disclosure is based on the rational design of Pfu DNA polymerase with amino acid sequence as shown in SEQ ID NO.1, and provides 16 possible mutation sites related to reverse transcription activity by homology modeling and structural prediction. The present disclosure is engineered through PCR to obtain the following mutant proteins: I38L、R97M、K118I、I137L、R382H、Y385H、V390I、K467R、Y495L、T515I、I522L、F588L、E665K、N713V、E735K、W769R.

Then test the activity of these mutants. If the mutants have reverse transcriptase activity, introduce other mutation sites on the mutants to obtain mutants with higher reverse transcriptase activity. Research has shown that introducing any of the four mutation sites, I137L, Y495L, T515I, and I522L, can cause a decrease or even complete loss of polymerase reverse transcriptase activity. In addition, the introduction of either the I137L or I522L mutation site can lead to a decrease in the progressive reverse transcription of the mutant, but the amount of reverse transcription products significantly increases at high enzyme levels. Moreover, the introduction of either Y495L or T515I mutation site can cause the mutant to lose reverse transcriptase activity. After extensive work, the present disclosure has successfully provided several Pfu DNA polymerase mutants with efficient and stable reverse transcriptase activity, among which K118I/N713V had the strongest reverse transcriptase activity, followed by E665K/E735K.

In the second aspect, The present disclosure provides some biological materials related to the Pfu DNA polymerase mutants mentioned above, including the following:
(a) Gene encoding Pfu DNA polymerase mutant;
(b) Recombinant expression vector containing the gene in (a);

(c) Recombinant cells containing genes from (a) or recombinant expression vectors from (b).

In some embodiments of the present disclosure, the nucleotide sequence of the gene encoding the wild-type Pfu DNA polymerase is shown in SEQ ID NO.2, and the gene encoding the Pfu DNA polymerase mutant can be obtained by Primer site directed mutagenesis based on the sequence shown in SEQ ID NO.2.

In the above-mentioned biomaterials, recombinant expression vectors include plasmid vectors and viral vectors.

In the thirdly aspect, the present disclosure provides the application of the above-mentioned biomaterials in the preparation of Pfu DNA polymerase mutants. The application method includes the following steps: cloning the gene encoding Pfu DNA polymerase mutant into an expression vector, introducing the obtained recombinant expression vector into cells to obtain recombinant cells, and purifying after expression.

In the fourth aspect, the present disclosure provides the application of Pfu DNA polymerase mutants in the preparation of reverse transcription reaction reagents or systems. Preferably, the Pfu DNA polymerase mutant is either the E665K/E735K mutant or the K118I/N713V mutant.

The Pfu DNA polymerase mutant provided by the present invention has reverse transcriptase activity, so it can synthesize cDNA by reverse transcription using RNA as a template. Meanwhile, due to the preservation of polymerase activity by the mutant, its calibration activity endows it with high fidelity.

Preferably, the reverse transcription reaction system further comprises a PCR reaction solution.

In the fifth aspect, the present disclosure provides the application of Pfu DNA polymerase mutants in RT-PCR reactions or RNA detection. The application method includes the following steps: using RNA as a template, reverse transcription synthesis of cDNA using Pfu DNA polymerase mutant, and amplification of the cDNA.

Preferably, the Pfu DNA polymerase mutant is the K118I/N713V mutant. This mutant exhibits reverse transcriptase activity in the temperature range of 76-74° C., with the best activity observed at 68° C.

The Pfu DNA polymerase mutants provided by the present disclosure have catalytic activity for DNA polymerization from 5' to 3' and corrective activity for 3' to 5', as well as both reverse transcriptase activity and high heat resistance. Therefore, these mutants can efficiently and high fidelity generate cDNA using RNA as a substrate, and then amplify the cDNA under conventional PCR reaction conditions without the need for additional reverse transcriptase, achieving one-step RT-PCR.

In the sixth aspect, the present disclosure provides a method for detecting RNA, comprising the following steps: performing RT-qPCR using Pfu DNA polymerase mutants, and qualitatively or quantitatively analyzing RNA based on fluorescence results.

In some embodiments, RNA is quantitatively analyzed based on the intensity of fluorescence signals generated by dyes or probes. Dyes can be SYBRGreen, EvaGreen, etc.

The advantages of the technical scheme proposed in the disclosure are:

The present disclosure provides mutants with efficient and stable reverse transcriptase activity (especially K118I/N713V mutant) by modifying wild-type Pfu DNA polymerase. These mutants can efficiently convert cDNA using RNA as a substrate and amplify the cDNA under conventional PCR reaction conditions, significantly improving the efficiency of detecting target RNA using RT-PCR. At the same time, the mutants simplify the RT-PCR detection scheme, which is more conducive to scheme optimization, such as adjusting the buffer composition to the most effective component for a single enzyme, and adjusting factors such as enzyme quantity, reaction temperature, and reaction time to the most favorable conditions for enzymatic reactions.

BRIEF DESCRIPTION OF THE DRAWINGS

Accompanying drawings provide a further understanding of embodiments of the disclosure. The drawings form a part of the disclosure and illustrate the principle of the embodiments of the disclosure along with the literal description. Apparently, the drawings in the description below are merely some embodiments of the disclosure. A person skilled in art can obtain other drawings according to these drawings without creative efforts. In the figures.

DETAILED DESCRIPTION OF PREFERRED EMBODIMENTS

The invention will be further described in detail in combination with embodiments to make the purpose, technical scheme, and advantages of the invention clear. The specific embodiments described herein are only used to explain the invention and are not intended to limit the invention.

Unless otherwise defined, all technical and scientific terms used in the disclosure have the same meanings as those commonly understood by those skilled in the art belonging to the disclosure.

The term 'biologically active fragment' refers to any fragment, derivative, homolog, or analog of Pfu DNA polymerase or its mutant sequence. In some embodiments, the biologically active fragments, derivatives, homologs, or analogues of Pfu DNA polymerase mutants exhibit the biological activity of Pfu DNA polymerase mutants in any in vivo or in vitro experiments.

The biologically active fragments can optionally include any number of contiguous amino acid residues of Pfu DNA polymerase mutant sequences. The present disclosure also includes a nucleotide encoding any such biologically active fragment and/or degenerate nucleic acid sequence.

The biologically active fragments can come from post transcriptional processing or translation from alternative splicing RNA, or can be generated through engineering modifications, batch synthesis, or other suitable operations. The biologically active fragments include fragments expressed in natural or endogenous cells, as well as fragments produced in expression systems such as bacteria, yeast, plants, insects, or mammalian cells.

'Mutant' in genes refer to a gene that has at least one nucleotide change, deletion, or insertion relative to the wild-type gene.

When the term 'Pfu DNA polymerase mutant' is used in the present disclosure, it collectively or individually refers to Pfu DNA polymerase mutant peptides that have been tested and exhibit enhanced reverse transcriptase activity.

'Wild type' refers to the form found in nature. For example, wild-type peptide or nucleotide sequences are sequences present in living organisms that have not been intentionally modified by human manipulation.

In some embodiments, methods (as well as related kits, systems, devices, and compositions) for conducting connection reactions are involved. The ligation reaction comprises the following steps: contacting a Pfu DNA polymerase mutant or its biologically active fragment with a nucleic acid template in the presence of one or more nucleotides, and using the Pfu DNA polymerase mutant or its biologically active fragment to ligate at least one of the one or more nucleotides.

The Pfu DNA polymerase mutants can be expressed in any suitable host system, including bacteria, yeast, fungi, rod-shaped viruses, plant or mammalian host cells.

When using bacteria as host cells, the promoters that can be used for transcription of Pfu DNA polymerase mutants can be obtained from genes derived from the following sources: *Escherichia coli* lac operon, *Streptomyces coelicolor* agar enzyme gene (dagA), *Bacillus subtilis* polysaccharide deer enzyme gene (sacB), *Bacillus licheniformis* alpha amylase gene (amyL), *Bacillus* thermophilic maltose amylase gene (amyM), *Bacillus amyloliquefaciens* alpha amylase gene (amyQ), *Bacillus licheniformis* penicillin enzyme gene (penP), *Bacillus subtilis* xylA and xylB genes, prokaryotic beta lactase gene, and tac promoter.

When using filamentous fungi as host cells, the promoters that can be used for transcription of Pfu DNA polymerase mutants can be obtained from genes derived from the following sources: *Aspergillus oryzae* TAKA amylase, *Aspergillus oryzae* aspartic protease, *Aspergillus niger* neutral 1-amylase, *Aspergillus niger* acid stable alpha amylase, *Aspergillus niger* or *Aspergillus oryzae* glucoamylase (glaA), *Aspergillus oryzae* lipase, *Aspergillus oryzae* alkaline protease, *Aspergillus oryzae* phosphogluconate isomerase, *Aspergillus nidulans* acetamidase and *Fusarium oxysporum* trypsin like protease, NA2-tpi promoter and their mutations, deletions, and hybridization promoters.

When yeast is used as the host cell, the promoters that can be used for transcription of Pfu DNA polymerase mutants can be obtained from genes derived from the following sources: Brewing Yeast enolase (ENO-1), Brewing Yeast galactose kinase (GAL1), Brewing Yeast ethanol dehydrogenase/glyceraldehyde-3-phosphate dehydrogenase (ADH2/GAP), and Brewing Yeast 3-phosphoglycerate kinase.

When expressed using rod-shaped viruses, the promoters used for transcription of Pfu DNA polymerase mutants can be derived from insect cell lines of the Lepidoptera order, such as the host armyworm. Gene expression is controlled by strong promoters, such as pPolh.

Plant expression vectors can be based on the Ti plasmid of *Agrobacterium tumefaciens*, or based on tobacco mosaic virus (TMV), potato virus X or rainbow tofu pudding virus. The commonly used promoter in plant expression vectors is the cauliflower mosaic virus (CaMV) 35S promoter.

When expressing Pfu DNA polymerase mutants in mammalian cells, mammalian cell lines such as Chinese hamster ovary (CHO) and COS (including human cell lines such as HEK and HeLa) can be used. Mammalian expression vectors include adenovirus vectors, pSV and pCMV series plasmid vectors, smallpox virus, retroviral vectors, and baculovirus, etc. Cytomegalovirus (CMV) and SV40 promoters are commonly used in mammalian expression vectors to drive gene expression. Of course, non viral promoters such as the elongation factor (EF)-1 promoter can also be used in mammalian expression vectors.

The control sequence used for expression can be a suitable transcription terminator, which is recognized by the host cell to terminate transcription. The transcription terminator can be connected to the 3' end of the nucleic acid sequence encoding the polypeptide. Any transcription terminator that works in host cells can be used.

For example, transcription terminators of filamentous fungi can be obtained from genes of *Aspergillus oryzae* TAKA amylase, *Aspergillus niger* glucoamylase, *Aspergillus nidulans* ortho aminobenzoate synthase, *Aspergillus niger* a-glucosidase, and *Fusarium oxysporum* trypsin like protease.

The transcription terminators of yeast cells can be obtained from genes of yeast enolase, yeast cytochrome C (CYC1), and yeast glyceraldehyde-3-phosphate dehydrogenase.

The control sequence used for expression can also be a suitable leader sequence, which is the untranslated region of mRNA that is important for host cell translation. The leader sequence can be connected to the 5'end of the nucleic acid sequence encoding the polypeptide. Any leader sequence that functions in the host cell can be used. The leader sequence of filamentous fungi can be obtained from the genes of *Aspergillus oryzae* TAKA amylase and *Aspergillus nidulans* phosphogluconate isomerase. The leader sequences suitable for yeast can be obtained from genes such as Enolase (ENO-1), 3-phosphoglycerate kinase, alpha factor, and Alcohol Dehydrogenase/Glyceraldehyde 3-Phosphate Dehydrogenase (ADH2/GAP) in *Saccharomyces cerevisiae*.

The control sequence can also be a polyadenylation sequence, which can be linked to the 3'end of a nucleic acid sequence. During transcription, the polyadenylation sequence is recognized by the host cell and signals the addition of polyadenylation residues to the transcribed mRNA. Any polyadenylation sequence that works in host cells can be used. The polyadenylation sequences that can be used for filamentous fungi can come from genes of *Aspergillus oryzae* TAKA amylase, *Aspergillus niger* glucoamylase, *Aspergillus nidulans* ortho aminobenzoate synthase, *Fusarium oxysporum* trypsin like protease, and *Aspergillus niger* alpha glucosidase.

The control sequence can also be the signal peptide coding region, which encodes the amino acid sequence connected to the amino end of the polypeptide and introduces the encoded polypeptide into the secretion pathway of the cell. The 5' end of the coding sequence of a nucleic acid sequence can inherently contain a signal peptide coding region, which is naturally connected to the coding region fragment encoding the secreted peptide in the translation reading frame. Alternatively, the 5' end of the coding sequence contains an exogenous signal peptide coding region. When the coding sequence naturally does not contain the signal peptide coding region, an exogenous signal peptide coding region may be required.

Alternatively, the exogenous signal peptide coding region can simply replace the natural signal peptide coding region to enhance peptide secretion. Any signal peptide coding region that introduces peptides into the secretion pathway of host cells can be used.

The effective signal peptide coding region of bacteria can be obtained from the genes of *Bacillus subtilis* NCIB11837 malt amylase, thermophilic fat loving *Bacillus* alpha amylase, *Bacillus licheniformis* subtilisin, *Bacillus licheniformis* beta lactase, thermophilic fat loving *Bacillus* neutral protease (nprT, nprS, nprM), and *Bacillus subtilis* prsA.

The effective signal peptide coding regions of filamentous fungi can be obtained from the genes of *Aspergillus oryzae* TAKA amylase, *Aspergillus niger* neutral amylase, *Aspergillus niger* glucoamylase, *Rhizopus oryzae* aspartic protease, *Aspergillus oryzae* specific cellulase, and *Mucor furfur* lipase.

The effective signal peptides of yeast can come from the genes of Brewing yeast alpha factor and Brewing yeast invertase. Signal peptides applicable to other host cell systems are also well-known.

The control sequence can also be the propeptide coding region that encodes the amino acid sequence located at the amino terminus of the polypeptide. The obtained peptide is called zymogen or peptide precursor. peptide precursor is usually inactive, but can be converted into mature active peptides through catalytic or autocatalytic cleavage. The coding regions of peptide precursor can be obtained from genes of *Bacillus subtilis* alkaline protease (aprE), *Bacillus subtilis* neutral protease (nprT), Brewing yeast alpha factor, *Rhizopus oryzae* aspartic protease, and thermophilic filamentous lactase.

When both the signal peptide region and the peptide precursor region are present at the amino terminus of the polypeptide, the peptide precursor region is located next to the amino terminus of the polypeptide, and the signal peptide region is located next to the amino terminus of the peptide precursor region.

Regulatory sequences may also be used to regulate the expression of Pfu DNA polymerase mutants. In some embodiments, regulatory systems are those that respond to chemical or physical stimuli causing gene expression to be turned on or off. In prokaryotic cells, suitable regulatory sequences include the lac, tac, and trp manipulation systems. In yeast cells, suitable regulatory systems include ADH2 system, GAL1 system, etc. In filamentous fungi, suitable regulatory sequences include TAKAa amylase promoter, *Aspergillus niger* glucoamylase promoter, and *Aspergillus oryzae* glucoamylase promoter. The regulatory systems of other host cells are also well-known.

In other embodiments, the regulatory sequence is a sequence that allows gene amplification. In eukaryotic systems, these include dihydrofolate reductase genes amplified in the presence of methotrexate and metallothionein genes amplified with heavy metals. In these cases, the nucleic acid sequence encoding the polypeptide of the present disclosure is effectively linked to the regulatory sequence.

In one embodiment, the recombinant expression vector comprises a nucleic acid sequence encoding a Pfu DNA polymerase mutant, one or more expression regulatory regions (such as promoters and terminators), and a replication origin. The various nucleic acid sequences and control sequences mentioned above are linked together to generate recombinant expression vectors. Recombinant expression vectors can include one or more restriction sites to insert or replace nucleic acid sequences encoding Pfu DNA polymerase mutants using these sites. Alternatively, the nucleic acid sequence of Pfu DNA polymerase mutant can be expressed by inserting the nucleic acid sequence or a nucleic acid construct containing the sequence into an appropriate expression vector.

The recombinant expression vector can be any vector that can perform recombinant DNA operations and can express the nucleic acid sequence of Pfu DNA polymerase mutants. The choice of vector usually depends on the compatibility between the vector and the host cell. The vector can be a linear or circular plasmid.

The vector can be a self replicating vector, which exists as an extra chromosomal entity and replicates independently of chromosome replication, such as plasmids, extra chromosomal elements, microchromosomes, or artificial chromosomes. The vector can contain any means to ensure self replication. The vector can also be a vector that integrates into the genome and replicates with the integrated chromosome after being introduced into the host cell. In addition, a single vector or multiple vectors can be used, which together contain the total DNA or transposons to be introduced into the host cell genom.

The vector preferably contains one or more selection markers that allow for easy selection of transformed cells. Selection markers refer to genes that provide virus resistance, heavy metal resistance, and resistance to nutritional deficiencies in their products. The selection markers for bacteria can be dal genes from *Bacillus subtilis* or *Bacillus licheniformis*, or markers with antibiotic resistance such as ampicillin, kanamycin, chloramphenicol, or tetracycline resistance. The selection markers for yeast can include ADE2, HIS3, LEU2, LYS2, MET3, TRP1, and URA3. The selection markers for filamentous fungi include amdS (acetyltransferase), argB (ornithine aminoformyltransferase), bar (phosphomycin acetyltransferase), hph (hygromycin phosphotransferase), niaD (nitrate reductase), pyrG (orosine-5'-phosphate decarboxylase), sC (sulfated adenylate transferase), and trpC (ortho aminobenzoate synthase). Selection markers applicable to other host cells are also well-known.

The vector preferably contains elements that allow the vector to integrate into the host cell genome or allow the vector to replicate independently of the genome in the cell. In order to integrate into the host cell genome, the vector can rely on the nucleic acid sequence encoding the polypeptide or any other element of the vector, and integrate the vector into the genome through homologous or non homologous recombination.

In addition, the vector may contain additional nucleic acid sequences for guiding integration into the host cell genome through homologous recombination. The additional nucleic acid sequence enables the vector to integrate into the host cell genome at precise positions within the chromosome. The above-mentioned integrated elements can be any sequence homologous to the target sequence in the host cell genome. In addition, the integrated elements can be a non coding or coding nucleic acid sequence.

The vector can further contain a replication origin that enables it to autonomously replicate in the host cell. The replication origin of bacteria can be P15Aori, or the replication origin of plasmids pBR322, pUC19, pACYC177 (which have P15Aori) or pACYC184 that allow replication in *Escherichia coli*, or the replication origin of pUB110, pE194, pTA1060, or pAM31 that allow replication in *Bacillus subtilis*. The replication origin of yeast cells can be a combination of replication origin ARS1, ARS4, ARS1 and CEN3, as well as a combination of ARS4 and CEN6.

One or more copies of the nucleic acid sequence of Pfu DNA polymerase mutant can be inserted into host cells to increase the production of gene products. The increase in copy number of nucleic acid sequences can be achieved by integrating at least one additional sequence copy into the host cell genome or by including amplifiable selection marker genes in the nucleic acid sequence.

The expression vector of Pfu DNA polymerase mutant with multiple copies can be obtained through purchase. Suitable expression vectors include Sigma Aldrich Chemicals, St. Louis Mo The p3×FLAG™ expression vector includes the CMV promoter and hGH polyadenylation site, as well as the pBR322 replication origin and ampicillin resistance marker. Suitable expression vectors also include pBluescriptII SK (–), pBK CMV, pBR322, pUC, pREP4, pCEP4, or pPoly.

The host cells used for expressing Pfu DNA polymerase mutants with multiple copies are well known in this field. Host cells can be bacterial cells, such as *Escherichia coli, Lactobacillus kefir, Lactobacillus brevis, Streptomyces* and *Salmonella typhimurium* cells; Fungal cells, such as yeast cells; Insect cells, such as fly S2 and beet armyworm Sf9 cells; Animal cells, such as CHO, COS, BHK, 293 and Bowes melanoma cells; And plant cells.

Various methods known in this field can be used to introduce nucleic acid sequences for expressing Pfu DNA polymerase mutants into host cells, including electroporation, bioballistic particle bombardment, liposome mediated transfection, calcium chloride transfection, and protoplast fusion.

The nucleic acid sequence encoding Pfu DNA polymerase mutant can be prepared using known synthetic methods. For example, multiple fragments of approximately 100 bases can be synthesized separately and then linked to form any desired continuous sequence. The nucleic acid sequences can be prepared through chemical synthesis, such as the phosphoramidite method, and the nucleotides used in the synthesis can be obtained from purchase.

Using any one or more well-known protein purification techniques, including lysozyme treatment, ultrasound treatment, filtration, salting out, ultracentrifugation, and chromatography, Pfu DNA polymerase mutants expressed in host cells can be recovered from cells and/or culture media.

Chromatographic techniques for purification of Pfu DNA polymerase mutants include reverse phase chromatography, high performance liquid chromatography, ion exchange chromatography, gel electrophoresis, affinity chromatography, etc. The purification conditions will depend in part on factors such as net charge, hydrophobicity, hydrophilicity, molecular weight, molecular shape, etc., which are obvious to those skilled in the art.

In some embodiments, affinity technology can be used to isolate Pfu DNA polymerase mutants. When using affinity technology, any antibody that specifically binds to Pfu DNA polymerase mutants can be used. In order to produce antibodies that specifically bind to Pfu DNA polymerase mutants, various host animals can be immunized by injecting the compound. The compound can be connected to a suitable carrier, such as bovine serum albumin, through side chain functional groups or linkers attached to side chain functional groups. According to the type of host animal, various adjuvants can be chosen to increase the immune response, such as Freund's adjuvant.

Example 1

Compared with the wild-type Pfu DNA polymerase, several Pfu DNA polymerase mutants provide by the present disclosure exhibit higher reverse transcriptase activity, among which the K118I/N713 V mutant (i.e. Pfu-M12) has the strongest reverse transcriptase activity.

This embodiment provides a method for preparing Pfu DNA polymerase mutants, including the following steps:

Connect the gene encoding the Pfu DNA polymerase mutant to pET23a to obtain the pET23a-Pfu mutant plasmid. Import pET23a-Pfu into *Escherichia coli* BL21 (DE3), and then inoculate it into LB liquid medium containing 50 μg/mL ampicillin antibiotic. Cultivate on a shaker at 37° C. and 220 rmp. When $OD_{600}$ reaches 0.8, cool down to 18° C. and induce overnight with IPTG. Centrifuge the culture medium (6000 rpm, 10 minutes) to collect bacterial cells, then wash the cells with Buffer A (20 mM Tris-Cl, pH 8.2, 100 mM KCl, 0.1 mM DTT). Resuspend the bacterial cells in Buffer A and add PMSF with a final concentration of 1 mM. Crush the bacterial cells and centrifuge (18000 rpm, 30 minutes) to collect the supernatant. Add 10 μL DNase I, 10 μL DNase I Buffer, and 5 μL RNase A to the supernatant, degrade the nucleic acid in a 37° C. water bath for 30 minutes, and then incubate in an 80° C. constant temperature water bath for 30 minutes to remove most of the miscellaneous proteins derived from *Escherichia coli*. Centrifuge at 18000 rpm for 30 minutes and collect the supernatant.

After filtration, the supernatant is purified using Ni-NTA. First, wash 10 column volumes each with 20 mM and 50 mM imidazole (added in 3 portions), then wash 3 column volumes each with 100 mM, 150 mM, and 200 mM sequentially, and take samples for SDS-PAGE detection. Collect elution components containing high-purity target protein, ultrafiltration and transfer to Buffer A. The purified target protein is concentrated using a Millipore 50 kDa ultrafiltration tube at 4° C. and 4000 rpm, and imidazole is removed by changing the solution. Enzyme concentration is quantitatively measured using BCA assay kit. After identifying the purity and activity of the purified protein, divide it into small portions, freeze them in liquid nitrogen, and store them at −80° C.

According to the above scheme, Pfu DNA polymerase mutants and wild-type Pfu DNA polymerase were prepared. Both the Pfu DNA polymerase mutants and wild-type Pfu DNA polymerase contain His-tag at the N-terminus for protein purification. The amino acid sequence of the wild-type Pfu DNA polymerase with His tag is shown in SEQ ID NO.3, and its gene sequence is shown in SEQ ID NO.2.

Figure 1:
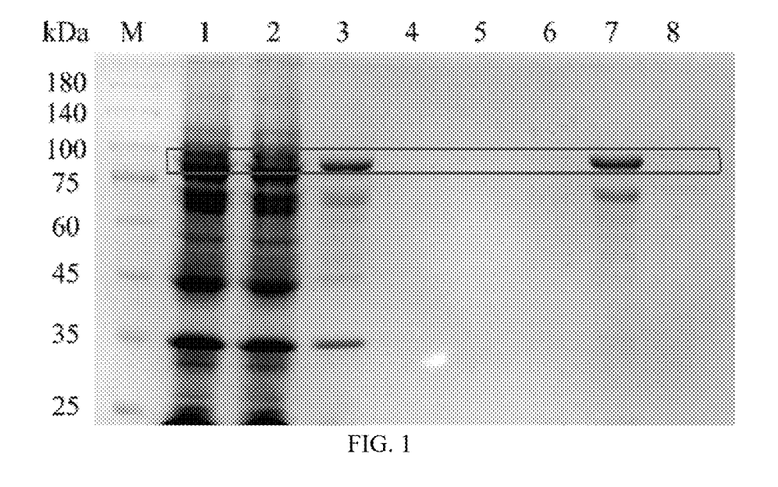
FIG. 1 is the purification results of the Pfu-M12 mutant in Example 1, and wherein, lane M ris the marker, lane 1 is the cell lysate, lane 2 is the supernatant after bacterial lysis, lane 3 is the supernatant after 30 minutes of treatment at 80° C., lane 4 is the product eluted with 10 mM imidazole, lane 5 is the product eluted with 20 mM imidazole, lane 6 is the product eluted with 50 mM imidazole, lane 7 is the product eluted with 100 mM imidazole, and lane 8 is the product eluted with 200 mM imidazole.

The purification results of Pfu-M12 mutant are shown in FIG. 1. The molecular weight of Pfu-M12 polymerase is about 90 kDa, which is consistent with the theoretical molecular weight. After treatment at 80° C. for 30 minutes, most of the impurities can be removed (lane 3). After concentration and removal of imidazole from the 100 mM imidazole elution product, the protein concentration of Pfu-M12 was determined to be 2.84 mg/mL.

Example 2

This embodiment tested the reverse transcriptase activity of Pfu DNA polymerase mutant, including the following steps:

(1) Add 5 pmol of synthesized RNA (TEMP.A.RNA), 5 pmol of corresponding reverse primer (25 FAM), 0.4 µg of wild-type Pfu DNA polymerase or its mutant, and RNase inhibitor to the reaction tube, mix well. Using a thermal cycler, heat the mixed liquid to 80° C. and maintain it for one minute, then anneal at a rate of 0.1° C./s until the temperature reaches 25° C. and maintain it for 2 minutes. RNA forms a ternary complex with enzymes and primers.

(2) Add 0.2 µL 10 mM dNTPs and 1 µL 10×PCR buffer to the annealed mixed liquid, and then replenish with DEPC water to 10 µL.

(3) Place the above reverse transcription system in a thermal cycler and react at 72° C. for 30 seconds. Subsequently, rapidly cool down to 12° C. to reduce polymerase activity and terminate the reaction. Add Blocker complementary to the RNA template to prevent the RNA template from affecting the detection results.

Add 2×RNA loading buffer of equal volume, incubate at 75° C. for 5 minutes, use 20% denatured polyacrylamide gel electrophoresis to separate products after reaction, and use gel imaging instrument for visual detection.

Repeat all extension experiments three times.

Figure 2:
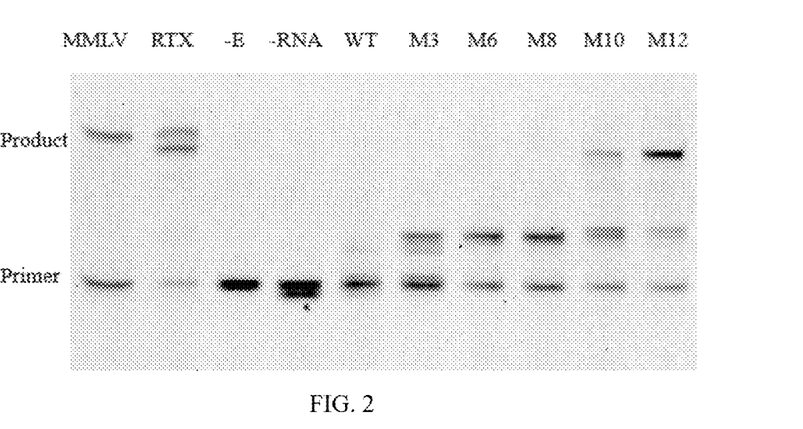
FIG. 2 is the reverse transcriptase activity detection results of the Pfu DNA polymerase mutant in Example 2, and wherein, MMLV is commercial MMLV reverse transcriptase, RTX is RTX reverse transcriptase, -E is the negative control without enzyme, -RNA is negative control without RNA, WT is wild-type PfuDNA polymerase, and M3, M6, M8, M10, M12 are different mutants.

FIG. 2 shows the activity detection results of Pfu-M12 and Pfu-M3 (K467R/F588L/W769R mutant), Pfu-M6 (R382H/Y385H/V390I mutant), Pfu-M8 (I38L/R97M mutant), and Pfu-M10 (E665K/E735K mutant). It can be seen that Pfu-M12 has the highest reverse transcriptase activity.

Example 3

According to the method in Example 2, this embodiment investigated the reverse transcriptase activity of Pfu-M12 mutant at different temperatures. Twelve temperature gradients were set up for the experiment, including 56° C., 57° C., 58° C., 60° C., 62° C., 64° C., 66° C., 68° C., 70° C., 72° C., 73° C., and 74° C. When the temperature of the thermal cycler reaches the set temperature, quickly add the reaction sample and react for 30 seconds.

Figure 3:
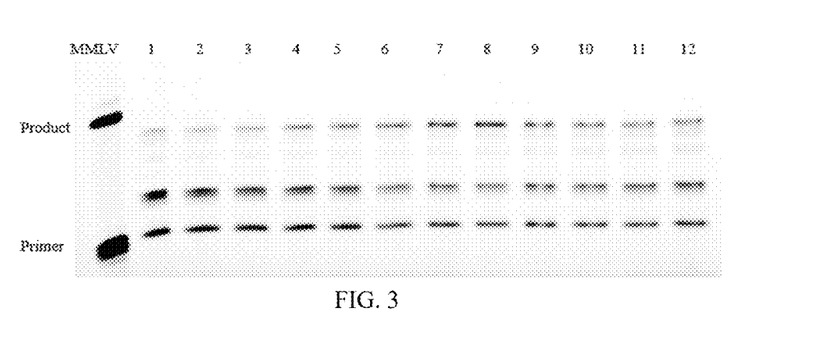
FIG. 3 is the reverse transcriptase activity results of the Pfu-M12 at different temperatures in Example 3, and wherein, MMLV is the positive control, lanes 1-12 is the reverse transcriptase products of Pfu-M12 at 56° C., 57° C., 58° C., 60° C., 62° C., 64° C., 66° C., 68° C., 70° C., 72° C., 73° C., and 74° C., respectively.

FIG. 3 shows the reverse transcriptase activity of Pfu-M12 mutant at different temperatures. The Pfu-M12 mutant exhibits reverse transcriptase activity within the temperature range of 56-74° C., with the highest reverse transcriptase activity observed at 68° C.

Example 4

According to the method in Example 2, this embodiment investigated the effect of Pfu-M12 mutant dosage on reverse transcription response. Each 0.1 µg is a gradient, and a total of 10 dose gradients are set within the range of 0.1-1 µg.

Figure 4:
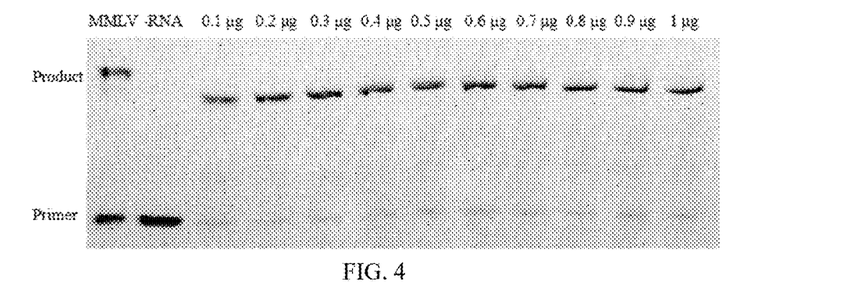
FIG. 4 is the detection results of the effect of Pfu-M12 mutant on reverse transcription efficiency under different dosage conditions in Example 4.

FIG. 4 shows the experimental results under different enzyme dosages. When adding 0.1 µg and 1 µg, the length of the product is basically the same. Therefore, it can be inferred that the dosage of Pfu-M12 is not the reason for the shorter product compared to MMLV.

Example 5

According to the method in Example 2, this embodiment optimized the reverse transcription reaction system. Specifically, the reverse transcriptase activity of Pfu-M12 mutant was measured in a reaction buffer containing 2.0-2.7 mM $MgCl_2$, 10-60 mM Tris-HCl, 0-14 mM KCl, and 0-18 mM $(NH_4)_2SO_4$.

Figure 5:
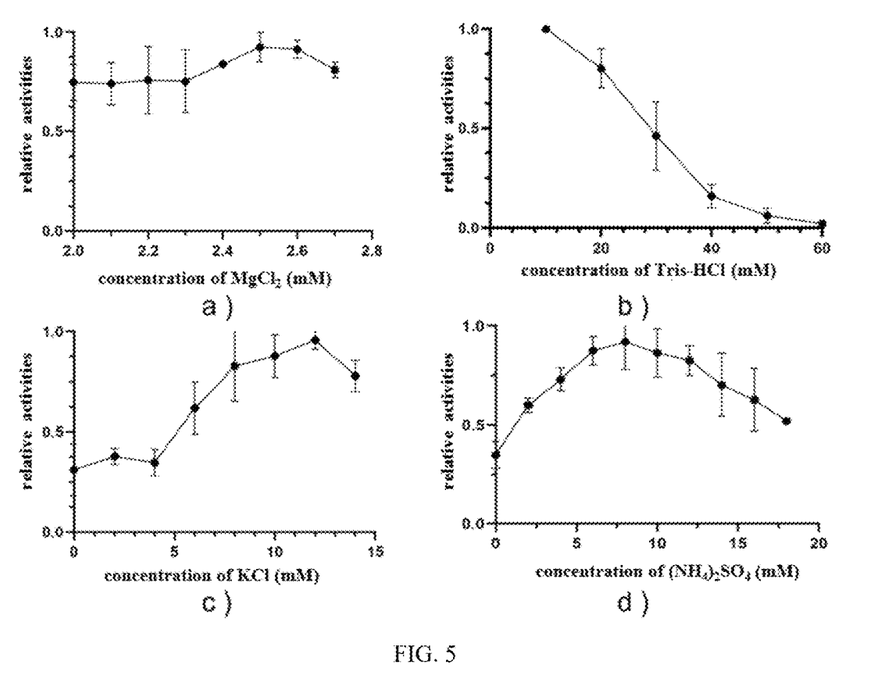
FIG. 5 is the detection results of the effect of reverse transcription reaction system on reverse transcription yield in Example 5.

FIG. 5 shows the reverse transcriptase activity of Pfu-M12 mutant in different reaction buffers. When the concentration of $Mg^{2+}$ is 2.5-2.6 mM, the reverse transcription products decrease with the increase of $Mg^{2+}$ concentration. As the concentration of Tris HCl increases, the activity of reverse transcriptase decreases, and 10 mM is the optimal concentration. With the increase of KCl and $(NH_4)_2SO_4$ content, the reverse transcriptase activity of the mutant gradually increased. When the KCl concentration reached 12 mM and the $(NH_4)_2SO_4$ concentration reached 8 mM, the reverse transcriptase activity of Pfu-M12 reached its peak and then began to decrease. Therefore, the most suitable conditions for reverse transcription of Pfu-M12 are: 10 mM Tris-HCl (pH 8.8), 2.5 mM $MgCl_2$, 12 mM KCl, 8 mM $(NH_4)_2SO_4$.

Figure 6:
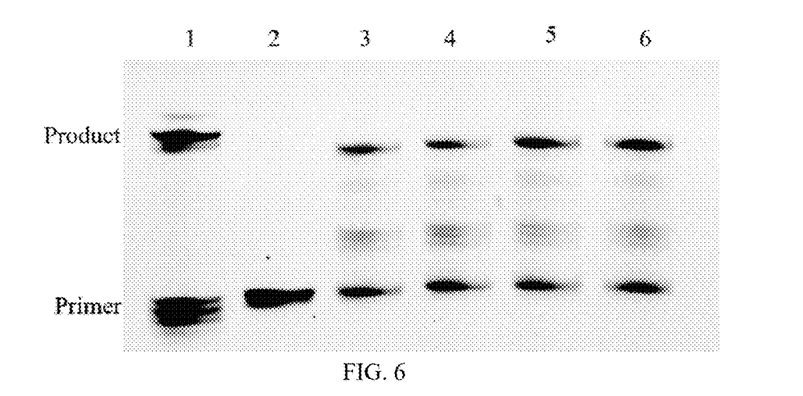
FIG. 6 is the comparison of reverse transcription detection results before and after optimization of the reverse transcription reaction system in Example 5, and wherein, lane 1 is the MMLV control, lane 2 is the negative control, lanes 3 and 4 are before optimization, lanes 5 and 6 are after optimization.

Under the condition of a reverse transcription time of 20 seconds, the Pfu-M12 mutant was used to compare the reverse transcription yield before and after buffer optimization. The results (FIG. 6) showed that the optimized reverse transcription yield increased by about 40%.

Example 6

This embodiment adopted EvaEZ™ Fluorometric Polymerase Activity Assay Kit for detecting polymerase activity of Pfu-M12 mutant. Used commercial Pfu DNA polymerase as the standard and performed testing according to the instructions of the kit. Finally, the polymerase specific activity of Pfu-M12 was detected to be 3145.54 U/mg.

Figure 7:
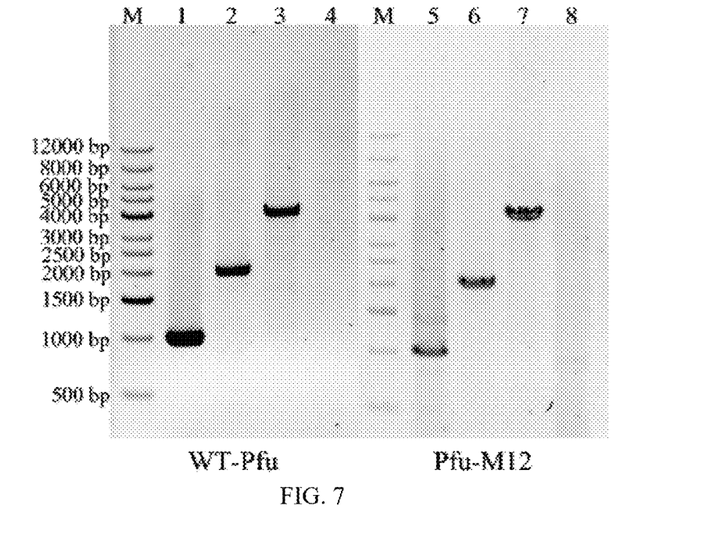
FIG. 7 is the polymerase activity detection results of the Pfu-M12 mutant in Example 6, and wherein, lane M is the marker, lane 1-4 is respectively wild-type Pfu DNA polymerase PCR amplified 1 kb, 2 kb, 4 kb, and 6 kb fragments, lane 5-8 is respectively Pfu-M12 mutant PCR amplified 1 kb, 2 kb, 4 kb, and 6 kb fragments.

This embodiment also tested the extensibility of the Pfu-M12 mutant during PCR. Under the condition of an extension time of 2 minutes, PCR amplification of 1 kb, 2 kb, 4 kb, and 6 kb long fragments was performed using the pRGEB32 plasmid as a template. The results showed that the polymerase activity and extensibility of Pfu-M12 were not affected, and a 4 kb fragment could still be produced within 2 minutes, consistent with the wild-type PfuDNA polymerase (FIG. 7).

Example 7

Using HIV RNA as a template, this embodiment validated the feasibility of using the Pfu-M12 mutant alone for RT-PCR detection. In order to confirm whether Pfu-M12 can directly amplify RNA without the reverse transcription step, PCR programs including reverse transcription and PCR programs without reverse transcription were set up.

According to the MMLV user manual, prepared cDNA using MMLV. Using cDNA as a template, PCR reaction was performed using Pfu-M12, and multiple negative controls were set up. The RT-PCR system and procedure are shown in Table 1 and Table 2.

TABLE 1

RT-PCR System

| Component | Dosage |
| --- | --- |
| RNA | 1 μL |
| Primer | 0.5 μL |
| polymerase | 0.2 U |
| dNTPs | 0.2 μL |
| Optimized buffer | 1 μL |
| RNase Inhibitor | 0.5 μL |
| DEPC H$_2$O | Up to 10 μL |

TABLE 2

RT-PCR Procedure

| Steps | temperature | Time |
| --- | --- | --- |
| Reverse transcription (optional) | 68° C. | 10 minutes |
| Pre-denaturation | 95° C. | 1 minutes |
| Denaturation | 95° C. | 10 seconds |
| Annealing | 58° C. | 10 seconds |
| Extension | 72° C. (Denaturation to extension cycle 30 times) | 30 seconds |
| Further extension | 72° C. | 5 minutes |
| Cooling | Up to 10 μL | |

Figure 8:
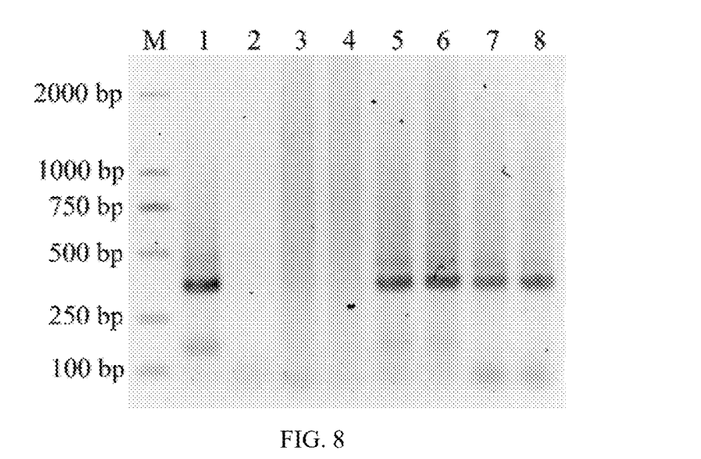
FIG. 8 is the product detection results of Pfu-M12 mutant mediated RT-PCR in Example 7, and wherein, lane M is the marker, lane 1 is the positive control, lane 2 is WT Pfu, lane 3 is the control without RNA template, lane 4 is the control after RNase treatment, lanes 5 and 6 are PCR without reverse transcription step, and lanes 7 and 8 are RT-PCR.

The test results showed that the expected size of the product can be obtained (FIG. 8). This indicates that the Pfu DNA polymerase mutant is feasible for RT-PCR detection. Moreover, when using Pfu-M12 mutation for RT-PCR, the additional reverse transcription step can be omitted (lanes 5 and 6 in FIG. 8). This is because the Pfu-M12 mutant has heat tolerance and can be amplified simultaneously with transcription.

In summary, the Pfu DNA polymerase mutants provided by the present disclosure exhibits highly efficient and stable reverse transcriptase activity. These mutants can efficiently convert cDNA using RNA as a substrate and amplify the cDNA under conventional PCR reaction conditions, significantly improving the efficiency of detecting target RNA using RT-PCR.

The above descriptions are only preferred embodiments of the present invention and are not intended to limit the present invention. Any modification, equivalent replacement, improvement, etc., made within the spirit and principle of the present invention shall be included in the protection of the present invention.

SEQUENCE LISTING

```
Sequence total quantity: 3
SEQ ID NO: 1           moltype = AA  length = 776
FEATURE                Location/Qualifiers
source                 1..776
                       mol_type = protein
                       organism = synthetic construct
SEQUENCE: 1
GILDVDYITE EGKPVIRLFK KENGKFKIEH DRTFRPYIYA LLRDDSKIEE VKKITGERHG   60
KIVRIVDVEK VEKKFLGKPI TVWKLYLEHP QDVPTIREKV REHPAVVDIF EYDIPFAKRY  120
LIDKGLIPME GEEELKILAF DIETLYHEGE EFGKGPIIMI SYADENEAKV ITWKNIDLPY  180
VEVVSSEREM IKRFLRIIRE KDPDIIVTYN GDSFDFPYLA KRAEKLGIKL TIGRDGSEPK  240
MQRIGDMTAV EVKGRIHFDL YHVITRTINL PTYTLEAVYE AIFGKPKEKV YADEIAKAWE  300
SGENLERVAK YSMEDAKATY ELGKEFLPME IQLSRLVGQP LWDVSRSSTG NLVEWFLLRK  360
AYERNEVAPN KPSEEEYQRR LRESYTGGFV KEPEKGLWEN IVYLDFRALY PSIIITHNVS  420
PDTLNLEGCK NYDIAPQVGH KFCKDIPGFI PSLLGHLLEE RQKIKTKMKE TQDPIEKILL  480
DYRQKAIKLL ANSFYGYYGY AKARWYCKEC AESVTAWGRK YIELVWKELE EKFGFKVLYI  540
DTDGLYATIP GGESEEIKKK ALEFVKYINS KLPGLLELEY EGFYKRGFFV TKKRYAVIDE  600
EGKVITRGLE IVRRDWSEIA KETQARVLET ILKHGDVEEA VRIVKEVIQK LANYEIPPEK  660
LAIYEQITRP LHEYKAIGPH VAVAKKLAAK GVKIKPGMVI GYIVLRGDGP ISNRAILAEE  720
YDPKKHKYDA EYYIENQVLP AVLRILEGFG YRKEDLRYQK TRQVGLTSWL NIKKLE      776

SEQ ID NO: 2           moltype = DNA  length = 2355
FEATURE                Location/Qualifiers
source                 1..2355
                       mol_type = other DNA
                       organism = synthetic construct
SEQUENCE: 2
atgcatcatc atcatcacca ctcttctggc atcctggacg ttgactacat taccgaagag   60
ggtaaaccgg tgatccgtct gttcaaaaaa gagaacggta aattcaaaat tgagcatgat  120
cgcaccttcc gtccgtatct gtacgctctg ctgcgtgacg acagcaaaat cgaagaagtg  180
aaaaaaatca cgggcgaacg ccatggcaaa attgtgcgca tcgtcgatgt ggaaaaagta  240
gagaaaaaat tcctgggtaa accgatcacc gtttggaaac tgtacctgga acacccacaa  300
gatgtaccaa cgatcatgga gaaagttcgt gagcaccag cggttgtaga catcttcgaa  360
tacgatatcc cgttcgccat ccgttacctg atcgataagg gtctgattcc gatggaaggc  420
gaagaggagc tgaaaatcct ggctttcgac atcgagactc tgtatcacga gggcgaggaa  480
ttcggtaaag cccgatcat tatgatttcc tacgctgatg aaaacgaggc taaagtcatt  540
acctggaaaa atattgacct gccgtacgtt gaagtcgttt cttccgaacg tgaaatgatt  600
aagcgttttc tgcgcatcat ccgtgaaaag gatccggaca tcatcgtgac ttacaacggc  660
gactcttttg atttcccgta cctgccaaa cgtgccgaaa aactgggtat caaactgacc  720
attggtcgtg acggttctga accaaaaatg cagcgcatcg gcgatatgac cgctgttgaa  780
gtgaaaggcc gcattcactt cgatctgtac catgtgatca cccgtactat caacctgcca  840
acgtacactc tggaagcggt atacgaagcg atcttcggca accgaaaga gaaagtttat  900
```

```
gcggacgaaa tcgccaaagc gtgggagagc ggcgagaacc tggagcgcgt ggccaaatat  960
tccatggaag acgctaaagc cacttacgaa ctgggtaaag aattcctgcc gatgaaatc  1020
cagctgagcc gtctggtcgg tcagcctctg tgggatgtct ctcgttcttc cacgggtaac 1080
ctggttgaat ggtttctgct gcgtaaagct tacgaacgta acgaggtggc accaaacaaa 1140
ccgtctgagg aagagtacca gcgccgtctg cacgaatctc acaccggtgg tttcattaag 1200
gagccggaaa aaggtctgtg ggaaaacatt gtttatctgg acttccgcgc tctgtatccg 1260
tccatcatca ttactcacaa cgttagcccg gatactctga acctggaggg ctgtaagaac 1320
tatgacatcg caccgcaggt tggtcacaag ttctgcaaag acatcccggg ctttatcccg 1380
tccctgctgg gtcatctgct ggaagaacgt cagaaaatca aaacccgcat gaaggaaacc 1440
caggacccga tcgaaaagat tctgctggat taccgtcaaa aagcaatcaa actgctggcc 1500
aacagctttt acggctacta tggctacgct aaagcgcgtt ggtactgtaa agagtgcgcg 1560
gagtccgtaa ctgcatgggg tcgtaaatac attgaactgg tatggaagga actggaagaa 1620
aaatttggtt tcaaagtgct gtacatcgac accgacggcc tgtacgcgac tattccgggc 1680
ggcgaatccg aagagatcaa aaaaaaagct ctggaattcg taaagtacat taactctaag 1740
ctgccgggtc tgctggaact ggaatatgaa ggtttctata aacgtggcct gtttgttacc 1800
aaaaaacgct acgcggtgat cgacgaagag ggtaaagtaa tcactcgcgg tctggaaatc 1860
gttcgccgtg attggtccga gatcgctaaa gaaacgcagg cacgcgtgct ggaaactatc 1920
ctgaaacacg gtgacgtgga ggaagcggtt cgtatcgtta aggaagtgat ccagaaactg 1980
gccaactacg aaatcccacc ggaaaagctg gcgatttata agcagatcac gcgcccactg 2040
cacgagtaca aagcaatcgg tccgcatgtt gctgttgcaa aaaaactggc agcaaagggc 2100
gtaaaaatca aaccaggcat ggttattggc tacattgtac tgcgtggtga tggtccgatc 2160
tccgtacgtg ctatcctggc tgaggaatat gatccgaaaa aacacaaata cgacgcggaa 2220
tattacatta agaaccaggt cctgccggca gttctgcgta ttctggaagg tttcggttat 2280
cgtaaggaag atctgcgcta tcagaaaact cgtcaggttg gcctgacctc tcgtctgaat 2340
atcaaaaaac tggaa                                                 2355

SEQ ID NO: 3           moltype = AA  length = 785
FEATURE                Location/Qualifiers
source                 1..785
                       mol_type = protein
                       organism = synthetic construct
SEQUENCE: 3
MHHHHHHSSG ILDVDYITEE GKPVIRLFKK ENGKFKIEHD RTFRPYIYAL LRDDSKIEEV  60
KKITGERHGK IVRIVDVEKV EKKFLGKPIT VWKLYLEHPQ DVPTIREKVR EHPAVVDIFE 120
YDIPFAKRYL IDKGLIPMEG EEELKILAFD IETLYHEGEE FGKGPIIMIS YADENEAKVI 180
TWKNIDLPYV EVVSSEREMI KRFLRIIREK DPDIIVTYNG DSPDFPYLAK RAEKLGIKLT 240
IGRDGSEPKM QRIGDMTAVE VKGRIHFDLY HVITRTINLP TYTLEAVYEA IFGKPKEKVY 300
ADEIAKAWES GENLERVAKY SMEDAKATYE LGKEFLPMEI QLSRLVGQPL WDVSRSSTGN 360
LVEWFLLRKA YERNEVAPNK PSEEEYQRRL RESYTGGFVK EPEKGLWENI VYLDFRALYP 420
SIIITHNVSP DTLNLEGCKN YDIAPQVGHK FCKDIPGFIP SLLGHLLEER QKIKTKMKET 480
QDPIEKILLD YRQKAIKLLA NSFYGYYGYA KARWYCKECA ESVTAWGRKY IELVWKELEE 540
KFGFKVLYID TDGLYATIPG GESEEIKKKA LEFVKYINSK LPGLLELEYE GFYKRGFFVT 600
KKRYAVIDEE GKVITRGLEI VRRDWSEIAK ETQARVLETI LKHGDVEEAV RIVKEVIQKL 660
ANYEIPPEKL AIYEQITRPL HEYKAIGPHV AVAKKLAAKG VKIKPGMVIG YIVLRGDGPI 720
SNRAILAEEY DPKKHKYDAE YYIENQVLPA VLRILEGFGY RKEDLRYQKT RQVGLTSWLN 780
IKKLE                                                            785
```

What is claimed is:

1. A method for detecting ribonucleic acid (RNA), comprising the following steps:
    using RNA as a template,
    performing reverse transcription-quantitative real-time polymerase chain reaction (RT-qPCR) using a *Pyrococcus furiosus* deoxyribonucleic acid (Pfu DNA) polymerase mutant; and
    qualitatively or quantitatively analyzing the RNA through fluorescence results,
    wherein the Pfu DNA polymerase mutant is selected from:
    K467R/F588L/W769R mutant, wherein the 467th, 588th, and 769th positions of the amino acid sequence shown in SEQ ID NO: 1 to arginine, leucine, and arginine, respectively;
    R382H/Y385H/V390I mutant, wherein the 382nd, 385th, and 390th positions of the amino acid sequence shown in SEQ ID NO: 1 to histidine, histidine, and isoleucine, respectively;
    I38L/R97M mutant, wherein the 38th and 97th positions of the amino acid sequence shown in SEQ ID NO: 1 to leucine and methionine, respectively;
    E665K/E735K mutant, wherein the 665th and 735th positions of the amino acid sequence as shown in SEQ ID NO: 1 into lysine; and
    K118I/N713V mutant, wherein the 118th and 713th positions of the amino acid sequence shown in SEQ ID NO: 1 to isoleucine and valine, respectively.

2. A method for detecting RNA, comprising:
    performing RT-qPCR on an RNA template using a Pfu DNA polymerase mutant; and
    analyzing the RNA based on fluorescence signal intensity, wherein the Pfu DNA polymerase mutant is K118I/N713V mutant, wherein the 118th and 713th positions of the amino acid sequence shown in SEQ ID NO:1 to isoleucine and valine, respectively.

* * * * *